United States Patent Office 3,531,254
Patented Sept. 29, 1970

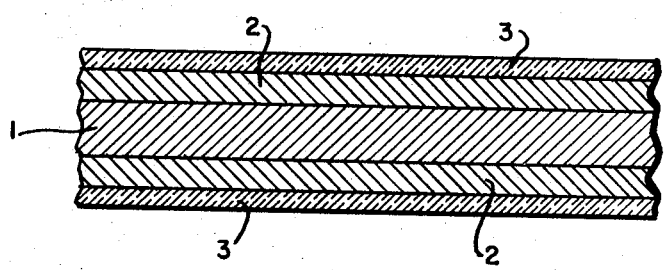

3,531,254
TEST ARTICLE AND METHOD FOR THE DETECTION OF UREA
Kiyoshi Okuda, Osaka, Japan, assignor to Chugai Seiyaku Kabushiki Kaisha, Tokyo, Japan, a corporation of Japan
Filed Oct. 23, 1967, Ser. No. 677,239
Claims priority, application Japan, Nov. 11, 1966, 41/74,143
Int. Cl. G01m 21/06, 31/04, 33/16
U.S. Cl. 23—230                5 Claims

ABSTRACT OF THE DISCLOSURE

A test article and a method of testing blood or urine samples for the qualitative and quantitative determination of urea therein wherein the test article comprises a permeable base material containing a strong cation exchange resin therein and coated with an acidic solution of p-dimethylamino cinnamaldehyde. The test article may be overcoated with a semi-permeable membrane. The blood or urine is tested by contacting a sample thereof with the test article and noting the red coloration that develops therein.

---

The present invention relates to a test article useful for detecting urea in a fluid, such as blood or urine. More particularly, the invention relates to a test article having an improved composition which provides more rapid and accurate quantitative determination of urea levels in fluids than prior test articles.

The detection of urea in body fluids, such as blood or urine, as well as the determination of its concentration therein is of great importance in the detection and treatment of kidney and liver diseases. A test article for qualitatively and quantitatively determining urea can also be used efficiently in routine urea analyses of body fluids in hospitals and physicians' offices.

One presently used method is based upon the fact that urea reacts with diacetylmonoxime (abbreviated to DAMO) in acidic solution by heating to form a visible color depending upon the urea concentration. This method is complicated and requires a long time for determination, so that it is not a suitable method for a bedside test or rapid screening.

Another method in use depends on the reaction of ammonia (formed from urea in the presence of urease) with phenol in alkaline solution in the presence of catalyst, such as sodium nitroprussid or the like, to form a blue color. Recently, a test paper has been proposed for use with this purpose. It contained a test mixture impregnated on a bibulous material. The impregnated mixture contained urease, alkaline compound, pH indicator dyestuff as an alkaline indicator, and a suitable buffer mixture. The principles underlying the basic reactions of enzyme tests for urea are well known. Urease hydrolyses urea to produce carbon dioxide and ammonia. The ammonia thus formed is diffused by the presence of alkali and is absorbed into the pH indicator dyestuff, and the color of the dyestuff changes. The amount of change of the dyestuff, and thus its resulting shade of color, is thus directly related to the amount of urea present in the sample being tested.

While the above described prior test article is a distinct advance, it has some disadvantages requiring a long time for the determination.

It is, therefore, an important object of the present invention to provide a rapid and accurate method of determining the concentration of urea in a small volume of a body fluid.

It has now been found that the concentration of urea may be rapidly determined by measuring the depth of color developed by the reaction of p-dimethylamino cinnamaldehyde (abbreviated to ACA) with urea in an acidic solution.

In accordance with the present invention, a test article for detecting urea in a fluid is provided which comprises a bibulous material containing impregnated therein a mixture which comprises p-dimethylamino cinnamaldehyde, an acidic mixture, and strong cation exchange resins. When this test article is used to detect urea in blood, it has a semi-permeable coating of transparent elthylcellulose or collodion film which forms a continous smooth layer over the impregnated bibulous material.

It has been well known that p-dimethylamino benzaldehyde reacts with urobilinogen in a urine to form a distinct red color and with urea to a color of near ultraviolet spectrum. From these results, it now has been determined that p-dimethylamino cinnamaldehyde reacts with urea to form a visible red color.

The present invention will be elucidated in the attached drawing which is an enlarged cross-sectional view of the test article. In the drawing, base member 1 is made of paper material or the like, into which strong cation exchange resins are mixed. A reaction surface 2 is formed on one or both sides of base member 1, by dipping the base member 1 in an acidic solution containing ACA and drying to form the reaction surfaces. A semi-permeable membrane coating 3 is provided to prevent the permeation of blood cells.

The present invention will be further described in the following illustrative example.

Amberlite SA-2 type ion exchange resin paper was utilized for the base member of a test article and the paper was dipped into 0.05 N hydrochloric acid solution containing 0.1% p-dimethylamino cinnamaldehyde for 30 minutes. The resulting impregnated paper was dried at room temperature. The dried paper was dipped into samples of serum containing different amounts of urea and was then removed. The test articles developed a red color varying with the amount of urea in the sample.

The impregnated test article began to develop the red color immediately, but the tint thereof became stable 30 seconds after it had been taken out.

The tint of the test article impregnated into a sample varied depending on urea concentration; for example, in the case of 10 mg./dl. urea concentration the tint developed corresponded to M.R. 5.8 in pH standard color table (made by Toyo Roshi Co., Ltd.) while in the case of 20 mg./dl. urea concentration M.R. 5.4 in the same table.

Measurement values which have been obtained by the present invention and by the DAMO method are shown respectively in Table 1.

TABLE 1.—A COMPARATIVE TABLE OF MEASUREMENT VALUES

| DAMO method ($y$) | Present method ($x$) | | | | | | |
|---|---|---|---|---|---|---|---|
| | 5–14 | 15–24 | 25–34 | 35–44 | 45–54 | >54 | Total |
| >55 | | | | 3 | 4 | 12 | 19 |
| 45–54 | | | | 4 | 4 | 1 | 9 |
| 35–44 | | 4 | 12 | 15 | 2 | | 33 |
| 25–34 | | 7 | 13 | 5 | | | 25 |
| 15–24 | 5 | 15 | 3 | | | | 23 |
| 5–14 | 63 | 10 | | | | | 73 |
| Total | 68 | 36 | 28 | 27 | 10 | 13 | 182 |

In this table $x$ represents the measurement value according to the present invention while $y$ represents that by the DAMO method.

Based on the table a linear regression between $x$ and $y$ was attempted in order to clarify the relation thereof. As the result, the following equations were obtained.

$$x = 0.86y + 2.1 \tag{1}$$

$$y = 1.01x + 1.3 \tag{2}$$

The coefficient of $x$ in the Equation 2 is greater than that of $y$ in the Equation 1.

This shows that the precision of the present method surpasses that of the DAMO method.

According to the present invention, ACA is utilized for the reaction agent. ACA has the characteristics of reacting with urea and forming a distinct red color rapidly, so that urea detection is simple and accurate and the time for detection is shortened.

Further, in the present invention strong cation exchange resins are mixed into the base member. Urea being charged positively will be absorbed on the surface of the test article. Therefore, the reaction will be promoted.

Further, in the present invention acids in the reaction agent act to accelerate the color development.

The test article may be more broadly used when a semi-permeable membrane coating is applied. Test articles without such a coating become red due to some pigments included in blood cells and it is not possible to discriminate between coolrs when impregnated directly with blood. The semi-permeable membrane coating makes direct detection possible.

From further investigation it was found that the test article formed a particular color of from red-violet to blue-violet if it was impregnated with a sample containing some kind of salicylic acid derivatives, such as p-amino salicylic acid and sulfamine, and it was desirable to restrain the administration of said medicines during urea detection. The fact, on the contrary, suggests that the test article of the invention could be also applied for the detection of p-amino salicylic acid and sulfamine.

By the test article of the invention nitrogen not derived from proteins of lower than normal level cannot be detected.

Furthermore, the test article also developed a red color if it was impregnated with a sample containing urobilinogen. However, there is a very little amount of urobilinogen in urine compared with that of urea so that there will be no fear during the urea detection.

It will be obvious to those skilled in the art that various changes may be made without departing from the scope of the invention and the invention is not to be considered limited to what is shown in the drawings and described in the specification.

What is claimed is:

1. A test article for determination of urea in fluids which comprises a base material containing a strong cation exchange resin and a coating of an acidic solution of p-dimethylamino cinnamaldehyde.

2. A test article according to claim 1 wherein said base material is paper.

3. A test article according to claim 1 having a coating thereon of a semi-permeable membrane.

4. A test article according to claim 3 in which the semi-permeable membrane is ethyl cellulose or collodion film.

5. A method of testing blood or urine for urea which comprises contacting a blood or urine sample with a test article of claim 1 and noting the red color that develops therein.

References Cited

UNITED STATES PATENTS 3,145,086   8/1964   Free et al. _____ 23—253

OTHER REFERENCES

Cline, R. E., et al.: Analytical Chemistry, vol. 28, pp. 47–52 (1956).

Sakai, S., et al.: Chemical Abstracts, vol. 55, p. 19616 (1961).

JOSEPH SCOVRONEK, Primary Examiner

E. A. KATZ, Assistant Examiner

U.S. Cl. X.R.

23—253; 252—408